United States Patent [19]
Hinkov

[11] Patent Number: 5,920,662
[45] Date of Patent: Jul. 6, 1999

[54] PLANAR ELECTRO-OPTICAL LIGHT BEAM DEFLECTOR AND PROCESS FOR PRODUCING THE SAME

[75] Inventor: Vladimir Hinkov, Kirchzarten, Germany

[73] Assignee: Fraunhofer-Gesellschaft zur Forderung der angewandten Forschung e.V., Munich, Germany

[21] Appl. No.: 08/924,719

[22] Filed: Aug. 29, 1997

Related U.S. Application Data

[63] Continuation of application No. 08/591,528, filed as application No. PCT/DE94/00889, Jul. 27, 1994, abandoned.

[30]     Foreign Application Priority Data

Aug. 4, 1993 [DE] Germany .......................... P 43 26 196

[51] Int. Cl.$^6$ ....................................................... G02B 6/10
[52] U.S. Cl. ................................ 385/14; 385/37; 385/36; 385/10; 359/322; 359/323
[58] Field of Search ...................................... 359/496, 256, 359/322, 323, 254, 259, 310, 269; 385/8, 10, 42, 36, 40, 41

[56]             References Cited

U.S. PATENT DOCUMENTS

| 5,093,874 | 3/1992 | Hawkins et al. | 385/8 |
| 5,202,790 | 4/1993 | Uchino et al. | 359/323 |
| 5,317,446 | 5/1994 | Mir et al. | 359/296 |

FOREIGN PATENT DOCUMENTS

| 9115277 | 6/1993 | France . |
| 3025096 | 1/1982 | Germany . |

OTHER PUBLICATIONS

"Fabrication of Periodic Domain Grating in LiNbO$_3$ by Electron Beam Writing for Application of Nonlinear Optical Processes", Electronics Letters, Jul. 4, 1991, vol. 27, No. 14, pp. 1221–1222.

"Modulation and Conversation of Light in Lithium Niobate Crystals with a Regular Domain Structure", A.A. Blistanov et al., Soviet Journal of Quantum Electronics, Dec. 16, 1986, No. 12, pp. 1678–1679.

"Ultrahigh Resolving Electrooptic Prism Array Light Deflectors", Yuichi Ninomiya, IEEE Journal of Quantum Electronics, Aug. 1973, No. 8, pp. 791–795.

*Primary Examiner*—Hung N. Ngo
*Attorney, Agent, or Firm*—Weingarten, Schurgin, Gagnebin & Hayes LLP

[57]             ABSTRACT

The invention concerns a planar electro-optical light-beam deflector with a line of prismatic deflectors, arranged side by side, exhibiting electrodes to which an electric voltage can be applied. It is essential to the invention that the light beam is conveyed in a Z-cut lithium niobate or lithium tantalate crystal, preferably in a monomodal layer waveguide extending along the surface of the latter, the prismatic deflectors each consisting of two triangular or prismatic zones in which a largely uniform polarization direction is generated by inversion of the polarization direction determined by the E-field vector in domains with spontaneous polarization in the opposite direction, each triangular zone exhibiting polarization in the direction opposite to that of the one adjacent to it, and that a rectangular electrode covering the triangular zones is attached to the upper side of the crystal and a counterelectrode to the lower side of the same. Achieved with the invented means is that a refractive index of the opposite sign is induced in neighboring triangular or prismatic zones when a voltage is applied between the electrode and counterelectrode, the refractive index distribution following a nearly ideal sawtooth curve. The invention furthermore concerns a process for the production of such a light-beam deflector.

20 Claims, 11 Drawing Sheets

PLANAR ELECTRO-OPTICAL LIGHT BEAM DEFLECTOR AND PROCESS FOR PRODUCING THE SAME

This application is a continuation of application Ser. No. 08/591,528, filed Feb. 2, 1996, now abandoned, which is a national stage of PCT/DE94/00889 filed Jul. 27, 1994.

FIELD OF THE INVENTION

The invention concerns a planar electro-optical light-beam deflector with a line of prismatic deflectors arranged alongside each other, exhibiting electrodes to which an electrical voltage can be applied.

The invention concerns furthermore a process for producing such a light-beam deflector.

BACKGROUND

Electronically controlled light-beam diverters, so-called deflectors, are employed for example in the case of optical memories or laser TV displays and the like. An important property of such a deflector is the achievable number of resolvable points, i.e. of individual angularly separated light-beam positions which can be generated. Known is the construction of a deflector with the aid of a prism, whose refractive index can be changed electro-optically. With a single prism of this type it is however possible to generate only about from 10 to 20 resolvable points. This is inadequate for most applications. For example, approximately 1,000 resolvable points are needed for application in a laser TV display. The option of arranging several prisms one behind the other, to increase the number of resolvable points, entails the disadvantage that the length of such a composite deflector would be correspondingly large. Light deflectors with a line of prisms arranged side by side do not have this disadvantage. In that case, each prism deflects a part of the light-beam, and to be sure in such a way that the entire beam is oriented in the desired direction once it has passed the deflector. To prevent destructive interference of the partially deflected partial beams in the remote radiation field, means are also known which permit the phase of each partial beam to be controlled electro-optically. Used for this purpose are a number of control electrodes, which are respectively positioned in front of the prism electrodes, arranged in the shape of a wedge, which form the prismatic deflection fields (DE 3,025,096 A1).

Electro-optical light-beam deflectors with deflector prisms arranged side by side, i.e. in the shape of a prism array, have been constructed both with so-called volume prisms (Yuichi Ninomiya, Ultrahigh resolving electro-optic prism array light deflectors. *IEEE Journal of Quantum Electronics*, QE-9, No. 8, August, 1973, pp. 791–795) as well as with integrated-optics waveguide prisms (DE-3,025, 096 A1). The main problem with prism-array deflectors is the generation of an ideal sawtooth curve development of the refractive index changes without roundings at the prism necks and without distortions between the prisms, from each deviation from an ideal curve development leads to amplified sidebands and worsening of the signal-noise ratio.

With volume prisms it is practically impossible to produce an ideal sawtooth curve development. Aside from the fact that it is technologically very inefficient to assemble such a deflector from individual crystal chips in order to achieve sharp boundaries between at least a few of the prisms, the thickness of the chips through which the light-beam passes is relatively large due to technological requirements and amounts to at least 200 $\mu$m. The result of this is that the electrical field distribution in such a chip is very inhomogeneous. As a consequence, the refractive-index plot exhibits large deviations from the ideal curve. These deviations are greatest in the center of the chip, the deviations being smaller, on the other hand, near the electrodes. A further disadvantage caused by the thickness of the chip is the high control voltage that must be used, approximately 1 kV, if an acceptable number of resolvable points is to be achieved.

The solution with waveguide prisms has the advantage over that with volume prisms that the light is guided in a thin layer, permitting a reduction in the magnitude of the control voltage applied to the electrodes. Due to the unfavorable electrode geometry, this must still be about from 400 to 500 V. Even this solution does not present the possibility of producing an ideal saw-toothed distribution of the refractive-index change. The reason for this is the extremely inhomogeneous electrical-field distribution between the electrodes mounted on the surface of the waveguide, which in turn produces distortions in the deflected light beam. The unfavorable electrode shape likewise restricts dimensions of the prism. To permit the use of a control voltage which is not excessively large, prisms are designed with a width of only about 50 $\mu$m. An aperture of 1 cm is necessary, if 1,000 resolvable points are to be achieved, i.e. about 200 prisms and an equal number of control voltages are needed, which brings with it the disadvantage of the comparatively great complexity of the control electronics required to achieve this.

The problem addressed by the invention is therefore to create a planar electro-optical light-beam deflector of the initially cited type, in which the disadvantages listed above are avoided and which exhibits a nearly ideal saw-toothed curve development. The invention addresses the problem, in addition to that, of creating the most efficient possible process for the production of such a light-beam deflector.

SUMMARY

The above-named problem is solved per the invention with a planar electro-optical light-beam deflector, as defined in claim 1. The invented light-beam deflector consists of a lamelliform Z-cut lithium niobate or lithium tantalate crystal in which the light beam is conveyed, and the prism deflector consists of two zones forming a three-sided prism in which a relatively uniform polarization direction is achieved by inversion of the polarization direction determined by the E-field vector in domains with a spontaneous polarization direction lying originally in the direction of the +Z axis, where respectively adjacent prismatic regions exhibit opposite directions of polarization, a rectangular electrode being attached to the crystal on these prismatic zones and the crystal provided on its lower side with at least one counter-electrode.

Advantageous developments of the invented planar electro-optical light-beam deflector are the object of sub-claims 2 through 12.

The additional problem addressed by the invention is solved with a process as indicated in claim 13.

In the case of the invented process, a prism structure is first produced in a lamelliform Z-cut lithium niobate or lithium tantalate crystal by producing an extensively uniform direction of polarization at least near the surface (upper side) within regions each forming a three-sided prism by inversion of the polarization direction in domains with a direction of polarization lying spontaneously in the direction of the +Z axis, in which case neighboring prism-shaped regions exhibit opposing directions of polarization, a rectangular electrode then being attached to the crystal on these prismatic regions, arranged side by side, and the lower side of the crystal provided with at least one counterelectrode.

Preferred execution variants of the invented process are presented in subclaims 14 through 21.

The invention takes advantage of the fact that it is possible to generate a largely uniform polarization direction in a few zones, at least in the vicinity of the crystal surface but also through the entire thickness of the crystal chip, by inversion of the polarization direction determined by the E-field vector $\vec{E}_S$, in domains with a spontaneous polarization direction originally in the opposite direction. This is accomplished, for example, on a +Z-cut lithium niobate crystal (an inversion is also possible however on a −Z-cut lithium niobate crystal) by the application of a titanium layer and subsequent heating to 1,000° C. The regions in which a largely uniform polarization direction is to be generated can in that case be formed very precisely as a triangle on the crystal surface by photolithographic means, thus producing three-sided prisms with sharp edges extending deep inside from the crystal surface. Taking note that respectively neighboring prismatic zones exhibit polarization in opposing directions, it is thus possible to induce a refractive index of differing prefix (n+Δn or n−Δn) in adjacent prismatic zones by the application of an electric voltage to an assigned common rectangular electrode corresponding to these zones. The refraction index distribution in this case nearly ideally sawtoothed.

BRIEF DESCRIPTION OF THE DRAWING

The invention is explained in detail below in terms of examples and associated drawings. In the drawings, in each case schematically.

DETAILED DESCRIPTION OF THE DRAWING

Figure 1:
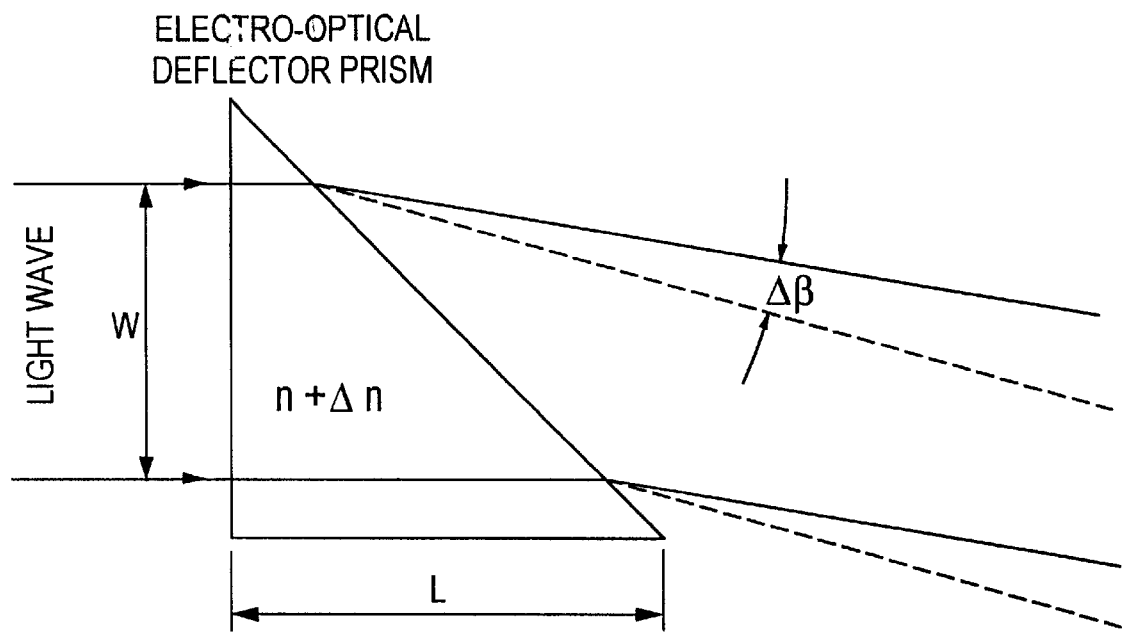
FIG. 1 shows the passage of a beam of light through an individual prism whose refractive index can be changed electro-optically from n to n+Δn.
Figure 2:
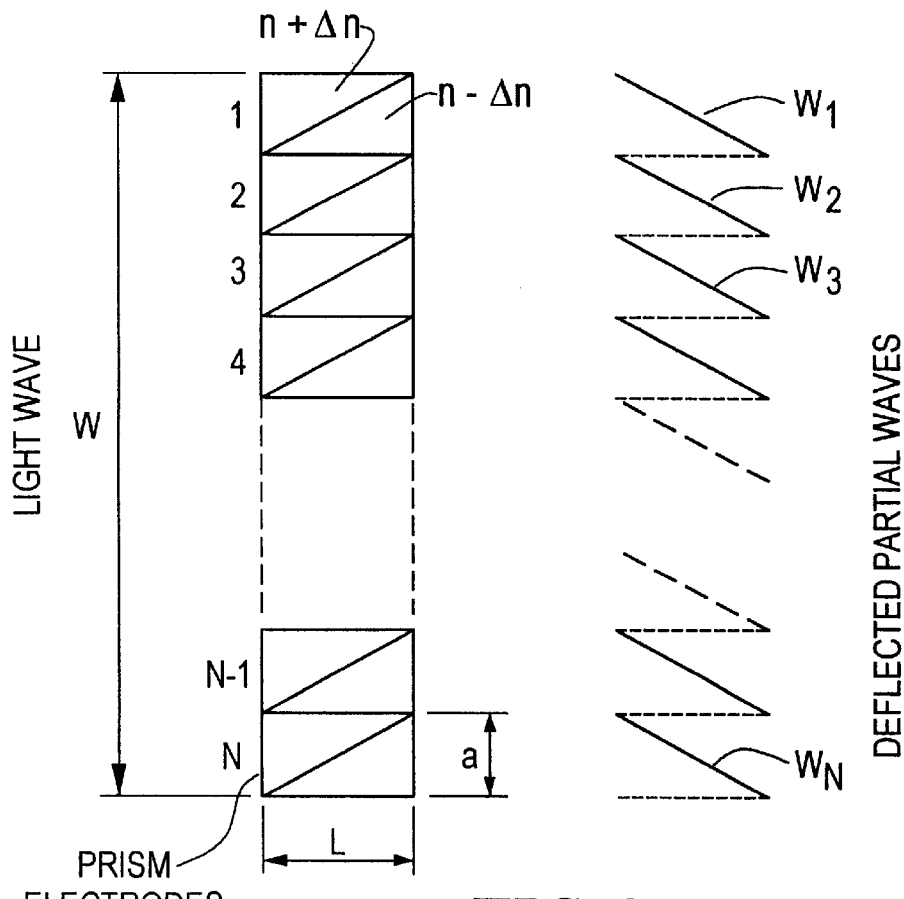
FIG. 2 shows the passage of the light beam through a plurality of prismatic deflectors arrange side by side.
Figure 3:
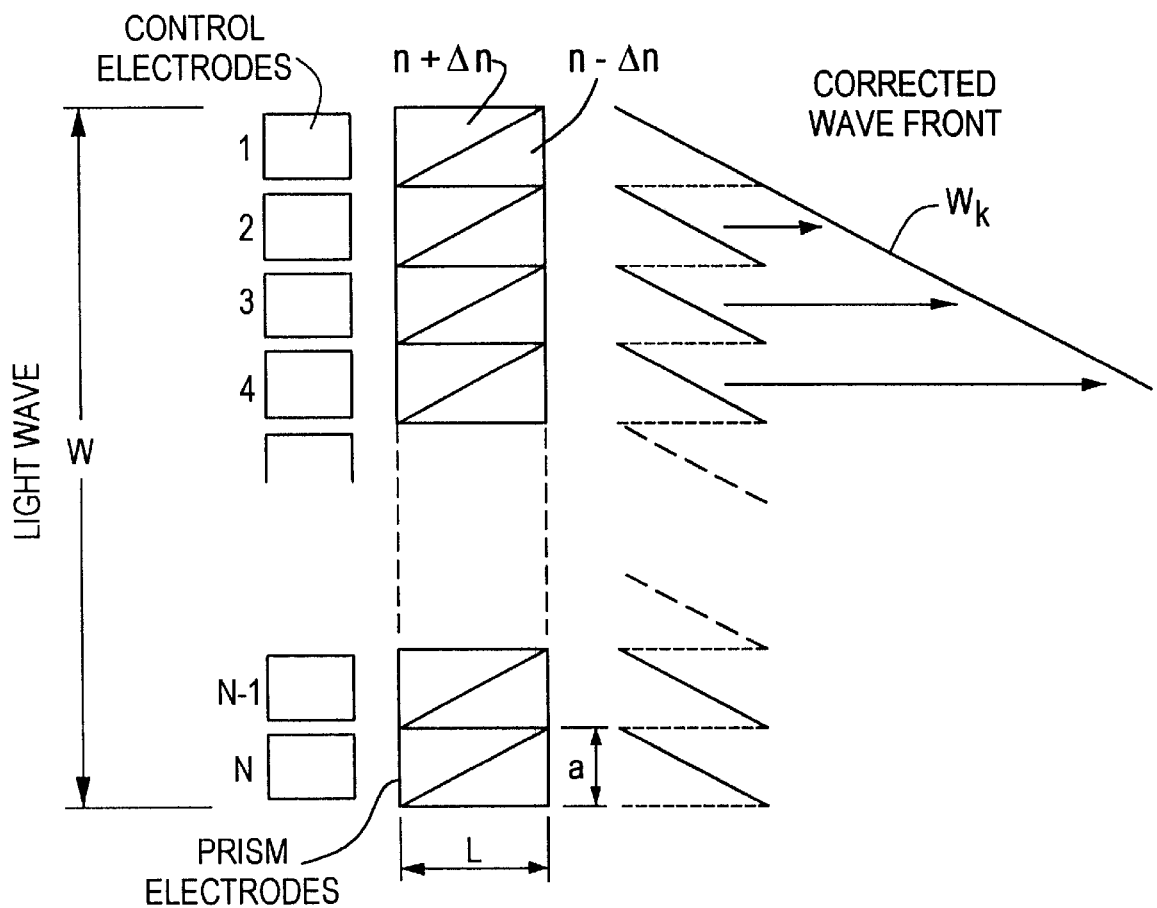
FIG. 3 shows the passage of a light beam through a plurality of prismatic deflectors, arranged side by side, each prismatic deflector being assigned to a control electrode for controlling the phase of the partial beams.
Figure 4:
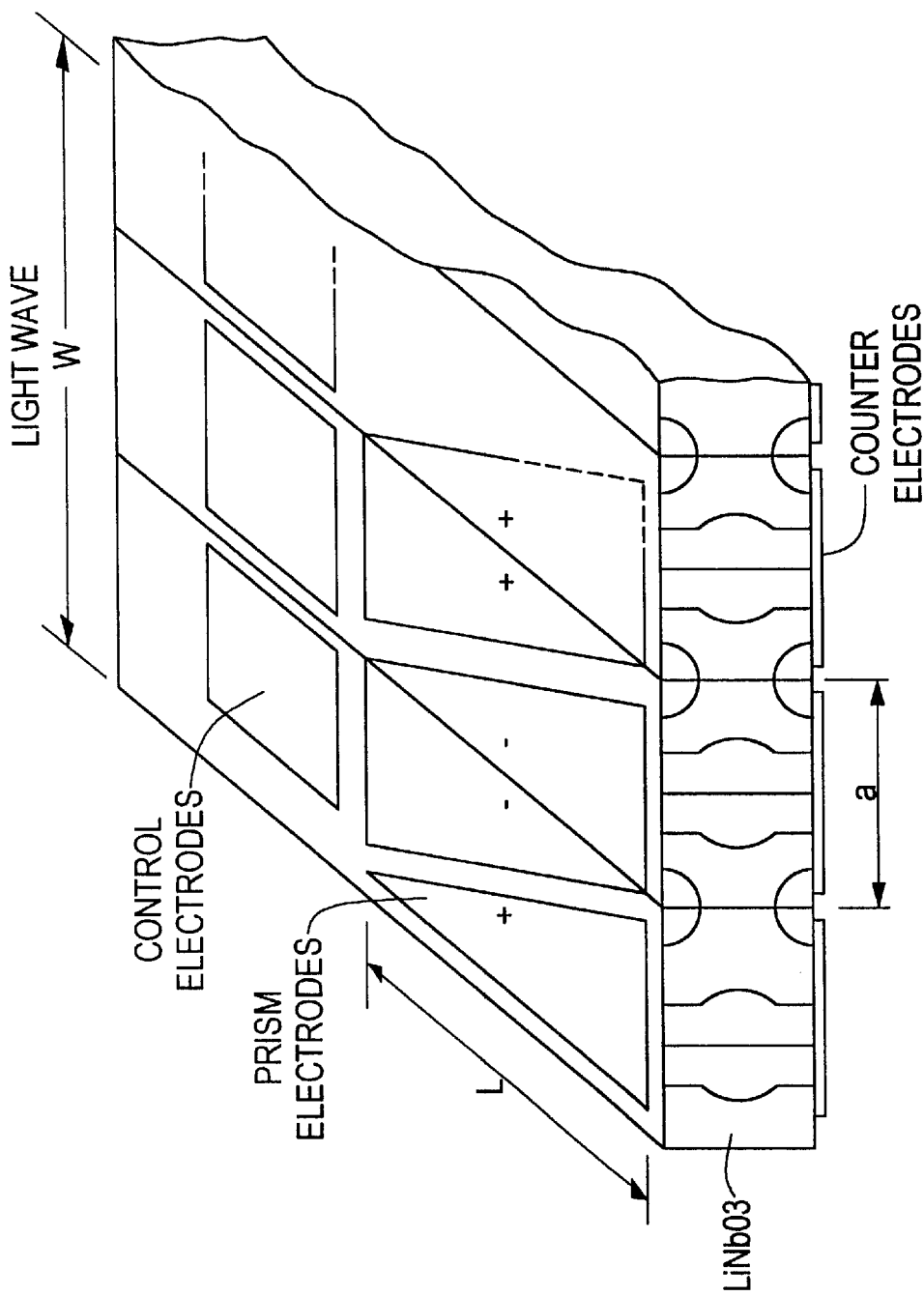
FIG. 4 presents a known electro-optical light-beam deflector composed of individual crystal chips.
Figure 5:
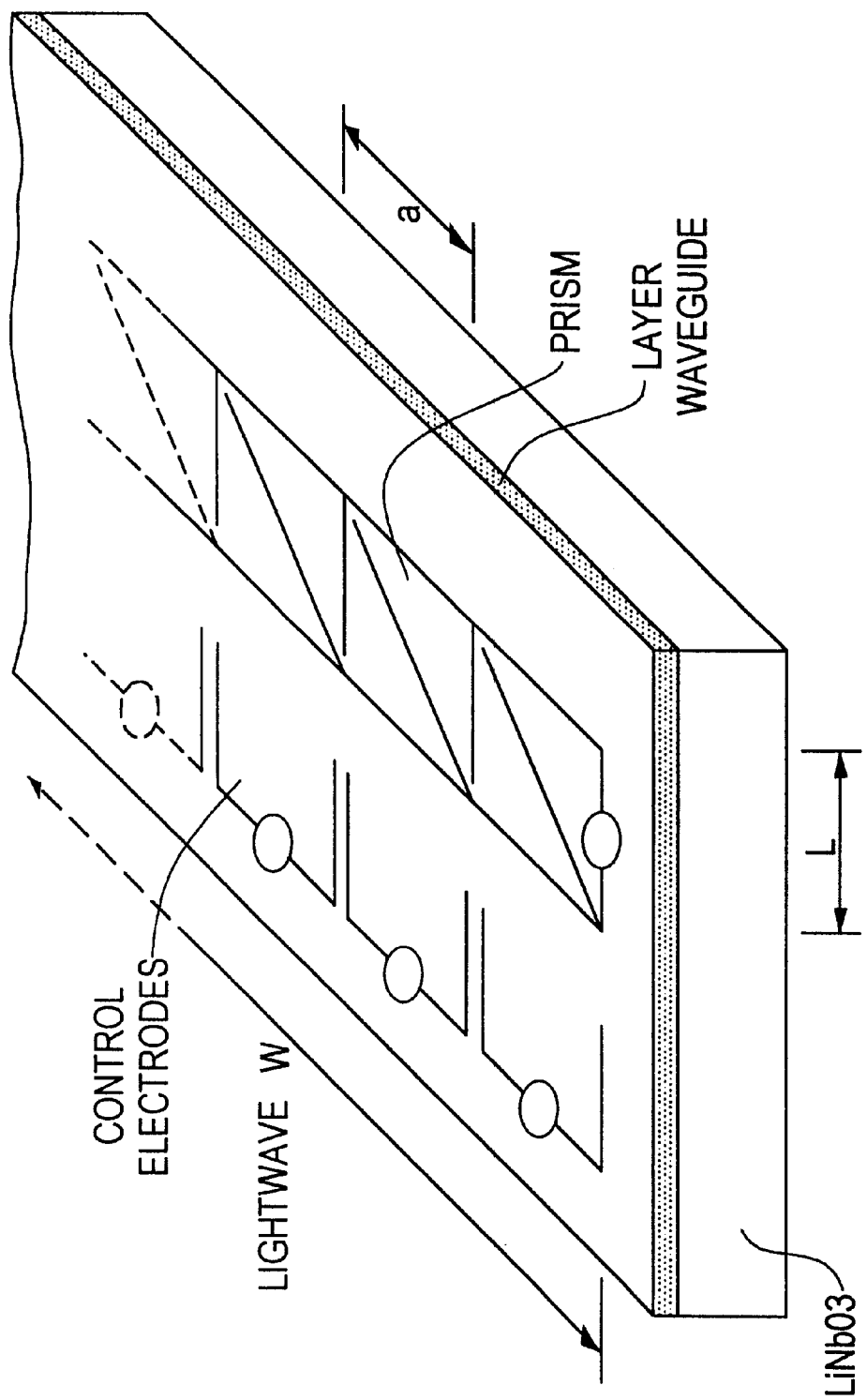
FIG. 5 shows a known electro-optical light-beam deflector, where the light is guided in a layer waveguide.

Shown in FIG. 1 is an individual prism, whose refractive index n can be changed electro-optically. W designates a wavefront of a light beam falling on this prism. This light beam is bent on leaving the prism as a function of the index of refraction n. If the refractive index is then changed electro-optically from n to n+Δn, the angle of refraction is changed by Δβ. Because only approximately from 10 to 20 resolvable points can be generated with the aid of such an individual prism by electro-optical modification of the refractive index, and thus of the angular position of a bent light beam, the arrangement of several prisms alongside one another in the form of an optical array to obtain greater resolution is know—as already explained above. FIG. 2 shows, schematically, such an arrangement with N prismatic deflectors positioned side by side. Each of these N identical prisms, with base length L and width a, deflects a part of the light beam impinging with the wavefront W. $W_1$ to $W_N$ designate the wave fronts of the respective partially deflected partial beams. Shown in FIG. 3 is the same arrangement presented in FIG. 2, only that in this case a number N of control electrodes equal to the number of prismatic deflectors is arranged in front of the prismatic deflection zone, prism electrodes arranged in the shape of a wedge thus forming individual prismatic deflectors. The phase of each partial beam can be controlled electro-optically with the aid of these control electrodes, the destructive interferences otherwise occurring in the remote field of the deflected beam being thus avoided. $W_K$ marks the corrected wavefront of the light beam deflected in this way. FIG. 4 shows a known execution variant of such a light-beam deflector, exhibiting a line of prismatic deflectors, arranged side by side, and associated control electrodes. This known light-beam deflector is assembled from individual lithium niobate crystal chips. Each of these crystal chips carries, on its upper side, a pair of wedge-shaped or triangular prism electrodes and a control electrode positioned in front of it. Mounted on the lower side of each crystal chip are corresponding counterelectrodes. If a corresponding electric voltage is applied to the prism electrodes, the refractive index in the zone lying beneath them can be changed from n to n+Δn or, in the zone of the neighboring prism electrode, from n to n−Δn. Because the crystal wafers exhibit however a thickness of at least 200 μm, and the adjacent electrodes have different polarity, the distribution of the electric field between the two electrodes is very inhomogeneous—as this is supposed to be indicated by the field lines entered in the drawing. This inhomogeneous electric field dispersion has the already mentioned significant deviations of the refractive-index distribution from the desired ideal curve as a result, which leads, finally, to unwanted distortions in the deflected light beam. The likewise known light-beam deflector per FIG. 5 has, of course, the advantage that, in this case, the light is conveyed in a layer waveguide, i.e. in a thin layer extending along the surface of a lithium niobate crystal serving as a substrate, and can thus be processed at the electrodes with a comparatively low voltage. But in this case, too, the markedly inhomogeneous electric field distribution between the electrodes, attached to the waveguide surface in the shape of a wedge, produces deviations from the ideal sawtooth curve development of the refractive-index distribution.

The invention provides in this case a remedy. A nearly ideal sawtooth refractive-index distribution is achieved by the procedure described below. The point of departure is the fact that lithium niobate and likewise lithium tantalate crystals are ferroelectric materials which exhibit a spontaneous polarization below a certain temperature without an external electric field, the Curie temperature $T_C$. The electric field vector $\vec{E}_S$ of the spontaneous polarization, in a monodomain lithium niobate crystal, points in the direction of the +Z axis. It is also along this axis that the largest electro-optical coefficient is to be recorded.

The invention then takes advantage of the fact that it is possible to generate a largely uniform direction of polarization in a few crystal zones, at least in the vicinity of the crystal surface but also through the entire thickness of the crystal chip, by inversion of the polarization direction determined by the E-field vector $\vec{E}_S$, in domains with spontaneous polarization in the opposite direction. This is accomplished, for example, on a +Z-cut lithium niobate crystal (an inversion is also possible on a –Z-cut lithium niobate crystal) by the application of a titanium layer and subsequent heating to 1,000° C. The regions in which a largely uniform polarization direction is to be generated can in that case be formed very precisely by photolithographic means as triangles or prisms with sharp edges and corners. Taking note that respectively neighboring prismatic zones exhibit polarization in opposing directions, it is thus possible to induce a refractive index with a different sign (n+Δn or n−Δn) in adjacent prismatic zones by the application of an electric voltage to an assigned common rectangular electrode corresponding to these zones. The refractive index distribution in this case nearly ideally sawtoothed.

Individual process steps in the production of a light-beam deflector per the invention are shown schematically in FIGS. 6a through 6d.

According to this process, the above-mentioned triangular or prismatic structure is first generated on the surface of the upper side of a Z-cut lithium niobate crystal 1 by generating a largely uniform polarization direction (6a) within the triangular region 2, at least in the vicinity of the surface, i.e. from 5 to 10 μm deep, by inversion of the polarization direction determined by the E-field vector $\vec{E}_S$ in domains with spontaneous polarization in the opposite direction.

Figure 6A:
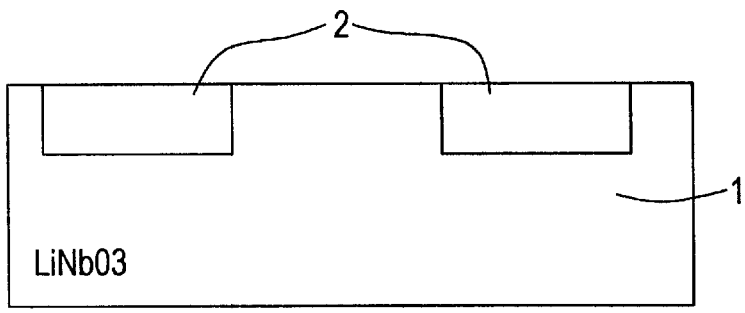
FIGS. 6a through 6d show individual process steps for the production of a light-beam deflector per the invention.
Figure 6B:
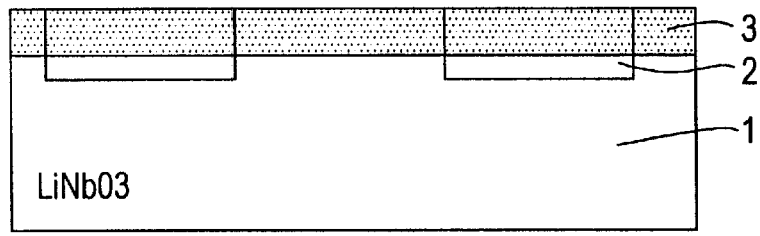

A monomodal waveguide 3 is then produced by proton exchange and subsequent tempering, extending over the entire upper side of the lithium niobate crystal 1 (FIG. 6b).

As the next step, a dielectric protective layer 4, consisting for example of silicon dioxide, vaporized or sputtered onto the waveguide 3. A metallic layer is then applied to the dielectric layer 4, from which a common rectangular metal electrode 5 (FIG. 6c), assigned to the triangular or prismatic zones 2, is formed by photolithography.

The lithium niobate crystal 1, thus prepared, is then turned over, i.e. with its upper side or with the waveguide side down, and cemented to a carrier 6 with the aid of an adhesive 7. The carrier 6 can be a lithium niobate crystal with the same cut or consist of glass or a different material. After cementing, the lithium niobate crystal 1 is then polished on the original bottom side, now lying on top, to a thickness of, for example, from 20 to 30 μm. Applied to the polished side, finally, is a metallic layer from which a common counterelectrode 8 or a number of counterelectrodes 8, lying opposite the prism electrodes 5, equal the same in number and corresponding to them in shape, are formed, for example, by photolithography (FIG. 6d).

Figure 6C:
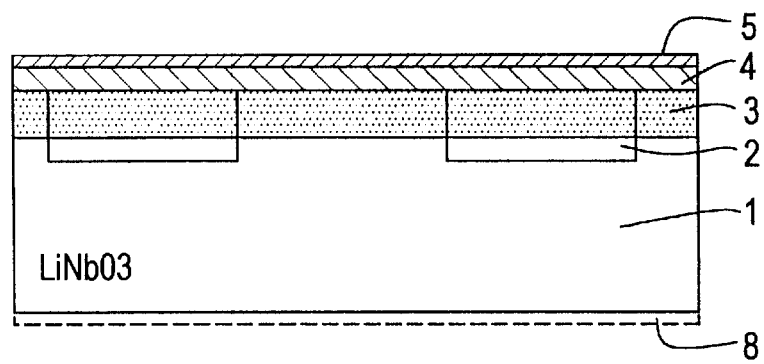
Figure 6D:
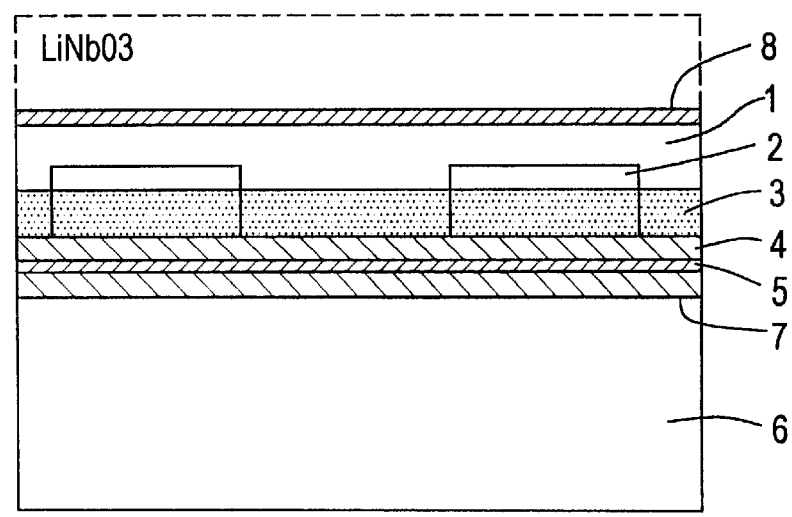

The production of the light-beam deflector can also be concluded however with the process step shown in FIG. 6c. That is to say, the metallic electrode 8 is applied directly to the lower side of the lithium niobate crystal 1 (as shown in FIG. 6 with dotted lines). The realization of a nearly ideally saw-toothed refractive-index distribution is also achieved in this case, except that the thickness of the lithium niobate crystal 1 can then not be less than 200 μm, and a higher voltage must be used between the electrodes 5, 8.

FIGS. 7a through 7e show a further possibility for the production of a light-beam deflector per the invention. Serving as a substrate is again a Z-cut lithium niobate crystal 1. A predominantly uniform polarization direction and thus the desired triangular or prismatic structure (FIG. 7a) is first generated, as in the case of the manufacturing process explained with the aid of FIG. 6, by inversion of the spontaneously present polarization direction of a few domains within triangular or prismatic zones also labeled in this case with reference numeral 2.

Figure 7A:
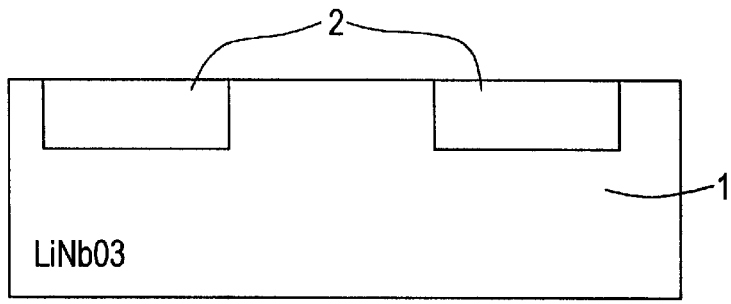
FIGS. 7a through e shows a further possibility for the production of a light-beam deflector per the invention.
Figure 7B:
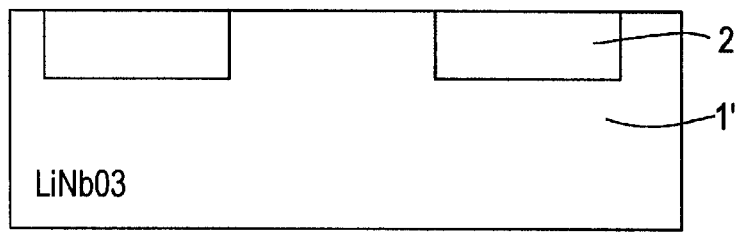

But then in a next step, which differs from the process described above, oxygen is diffused out of the lithium niobate crystal 1 for the purpose of obtaining an electrically conductive crystal 1 (FIG. 7b). This is accomplished, for example, by heating the lithium niobate crystal 1 for several hours to approximately 400° C., under a vacuum, for several hours.

Figure 7C:
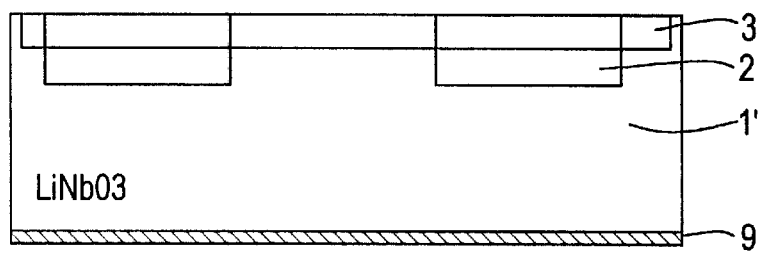

The oxygen diffusion is then followed by the production of the waveguide 3 by proton exchange, followed by tempering. In that case, the lower side of the electrically conductive lithium niobate crystal 1' is protected from the addition of oxygen by an applied metallic layer 9 (FIG. 7c).

Figure 7D:
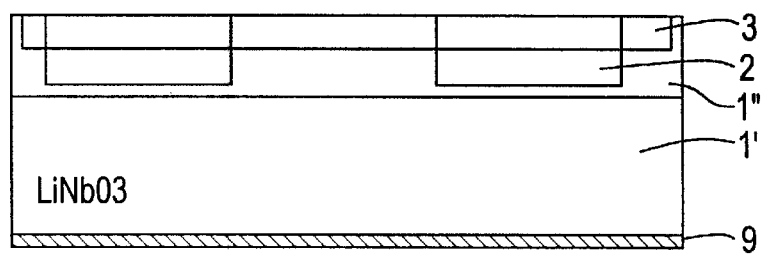

In the next step, oxygen is diffused in via metered doses and, of course, from the upper side. The depth of diffusion should in that case extend only a few μm (more than three optical wavelengths) below the waveguide 3. This zone, in which the lithium niobate crystal has again lost its electrical conductivity, is designated with 1" (FIG. 7d).

Figure 7E:
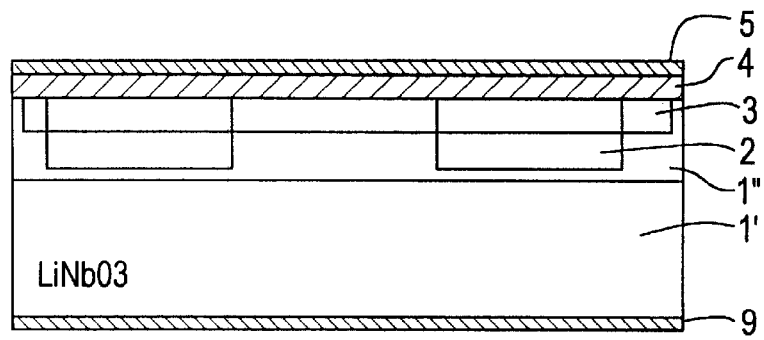

Once the oxygen diffusion is complete, the electrical protective layer 4 and then the metallic electrodes 5 are applied to the waveguide 3, one after the other (FIG. 7e). The lower zone of the lithium niobate crystal serving as the substrate, labeled 1', in which the oxygen removed by diffusion has not been replaced, retains good electrical conductivity and is used as the counterelectrode.

Figure 8A:
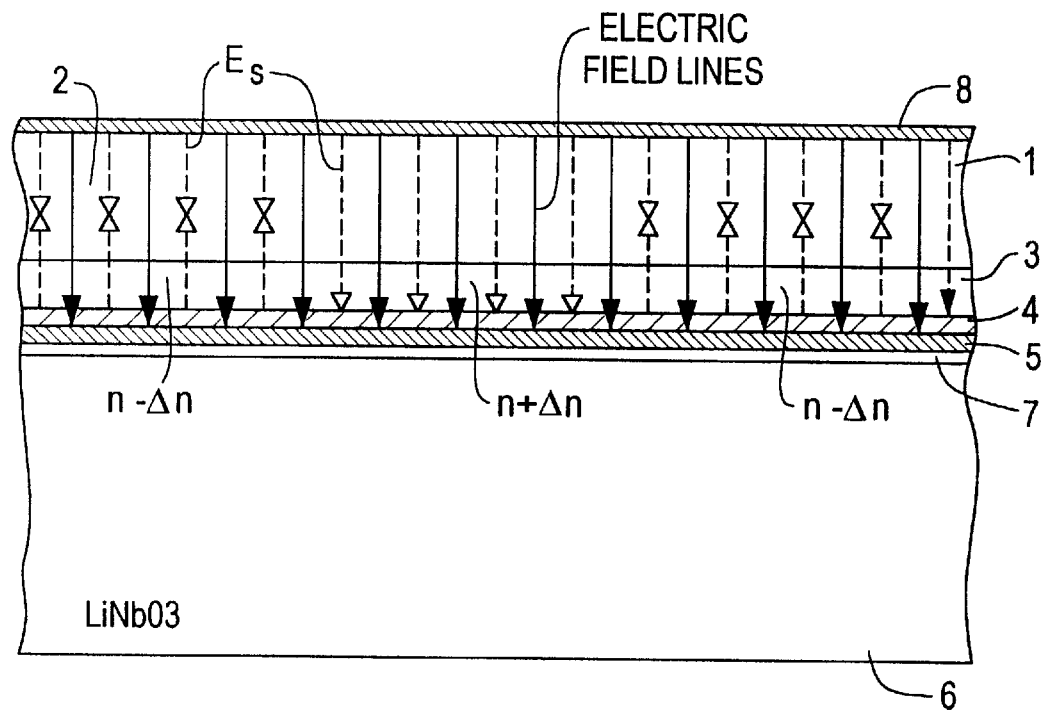
FIG. 8a is a cross section through the light-beam deflector per FIG. 6d.
Figure 8B:
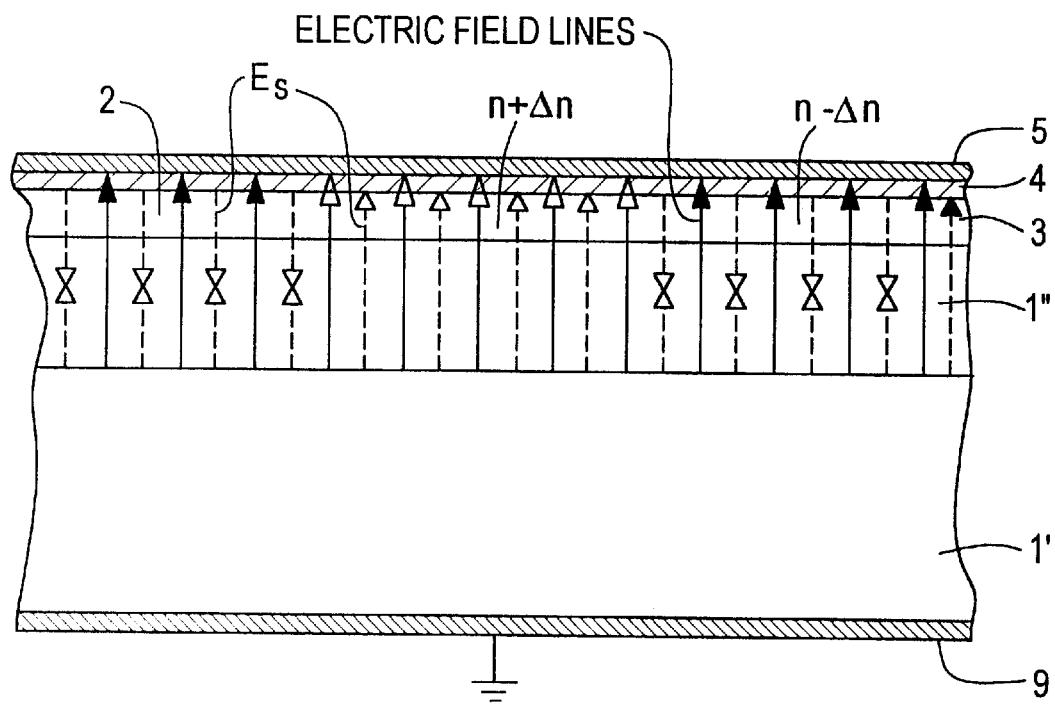
FIG. 8b is a cross section through the light-beam deflector per FIG. 7e.

While FIG. 8a shows a cross section through a light-beam deflector, produced according to the method explained with the help of FIGS. 6a through d, FIG. 8b shows a cross section through a light-beam deflector, as produced with the process presented with the help of FIGS. 7a through e. Respectively shown in both drawings are both the course of the field lines of the electrical field in the presence of an applied voltage between electrodes 5 and 8 or between electrode 5 and the conductive zone of the substrate material 1' connected to electrode 9 as well as the vector $\vec{E}_S$ of the spontaneous polarization in the inverted zones, as well as an indication of the corresponding refractive-index change n−Δn or n+Δn induced in the waveguide 3 with a voltage applied to the electrodes.

In the place of the lithium niobate crystal, it is also possible to use a lithium tantalate crystal as the substrate.

Likewise, ITO-layers can be utilized instead of the metallic electrodes. The dielectric protective layer can be eliminated when these electrically conductive transparent layers are used.

If the layer waveguide 3 is not used and the light beam is conveyed in the entire lamellar Z-cut lithium niobate or lithium tantalate crystal 1, the triangular or prismatic zones 2 must extend through the entire thickness of the crystal chip 1.

Using the production method described, it is possible, in a favorable manner, to manufacture light-beam deflectors adapted to different applications.

Figure 9:
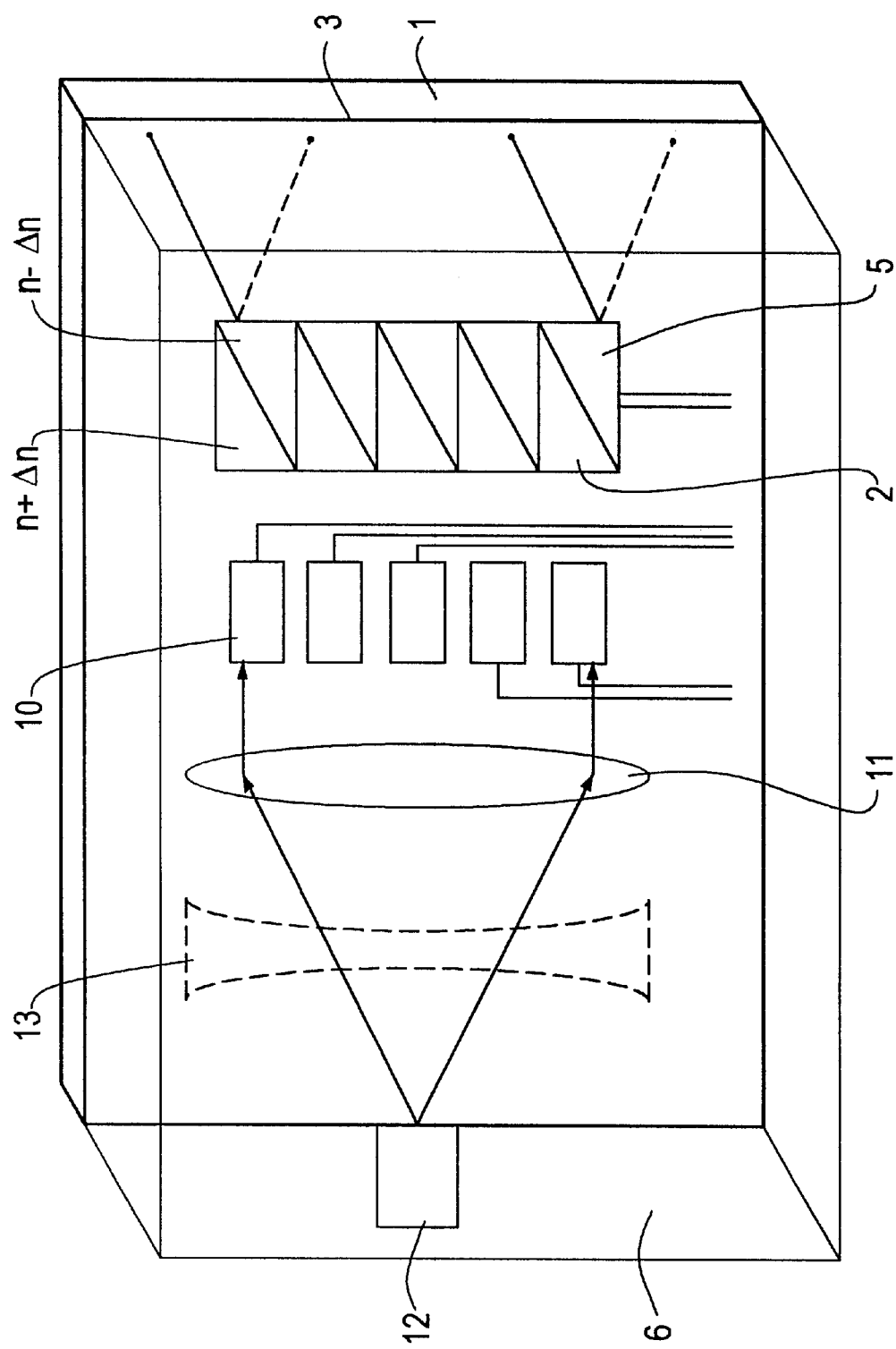
FIG. 9 presents an invented light-beam deflector with further integrated-optical elements on a lithium niobate crystal as a substrate, the light conducted in a layer waveguide.

FIG. 9 shows such an execution variant. Generated in this case, on the Z-cut lithium niobate crystal serving as a substrate, are not only the layer waveguide 3 extending over the entire surface and the triangular or prismatic structure with the region 2 exhibiting a largely uniform direction of polarization and the associated electrode 5 (the counterelectrodes not being shown), the same substrate element carries in addition five control electrodes 10, arranged on the layer waveguide 3 and in front of five prismatic deflectors placed side by side in the direction of light-beam expansion, as well as a convergent lens 11 positioned in front of it. Whereas the control electrodes 10 are provided for the purpose of the electrical-optical phase control of the partial beams deflected by the prismatic beam deflectors, the convergent lens 11 which can be produced, by proton exchange, directly upon the layer waveguide 3 as an integrated-optical structural element, serves for the collimation of the strongly divergent light beam, which is generated in the example by a laser diode coupled to the waveguide 3 at the end and is of course to be deflected with the aid of the light-beam deflector. If it is necessary produce a larger aperture of the collimated light beam, it is also possible to insert an integrated-optical divergent lenses in front of it.

It is also obviously possible to couple the light into the waveguide 3 with the aid of an optical fiber in the place of the direct coupling of the laser diode 12.

Figure 10:
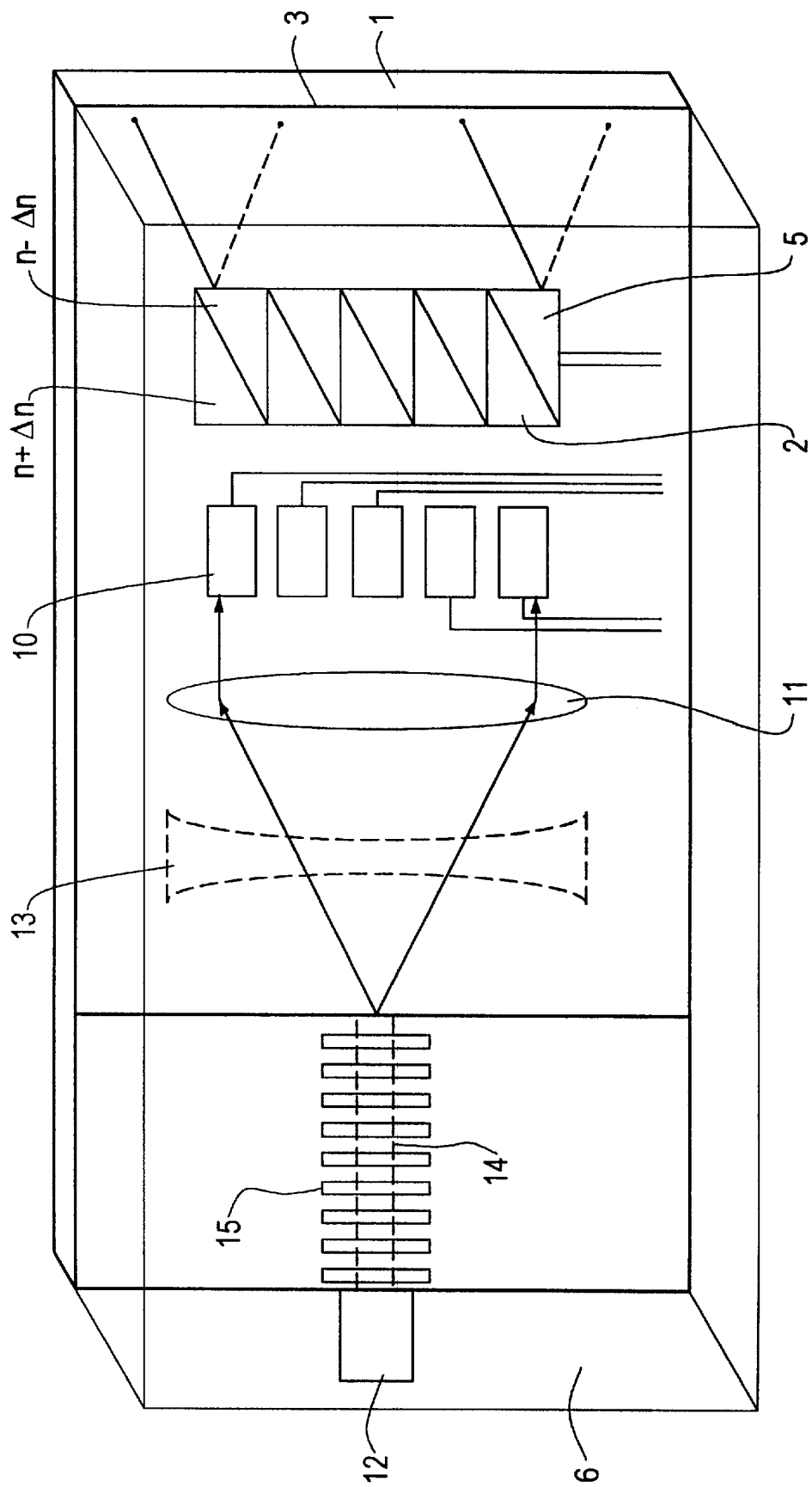
FIG. 10 shows the light-beam deflector per FIG. 9, but with a specially structured strip waveguide, over which the light is coupled into the layer waveguide.

An execution variant, particularly suitable for use in systems for optical storage, is seen in FIG. 10. In this case, the waveguide is formed as a waveguide 3 in the forward zone, facing the light-entry side, of the surface of the lithium niobate crystal 1 serving as a substrate and only in the zone adjacent to the convergent lens 11, exhibiting the control electrode 10 and the prismatic deflector 2, 5. The strip waveguide 14 is in that case provided with a periodic grating structure 15, by producing a largely uniform polarization direction within the individual elements forming the grating, in the same manner used to generate the prismatic zones 2 in the vicinity of the surface of the lithium niobate crystal 1, by inversion of the direction of polarization in domains with spontaneous polarization in the opposite direction, in which case respectively adjacent grating elements exhibit polarization in opposite directions, the periodicity being selected in such a way that a phase synchronization is achieved for a frequency doubling of the light conveyed in the strip waveguide 14. This means that light with a wavelength of 0.4 $\mu$m is generated in the strip waveguide 14 when light with a wavelength of, for example, 0.8 $\mu$m, is fed in and this shortwave light is then collimated by means of the convergent lens 11 and deflected with the aid of the prismatic deflector 2, 5.

The utilization of shortwave light is significant, particularly with optical storage chips, because its layering is more sensitive for the shortwave region, permitting a significant increase in write density in comparison with the use of light having a long wavelength.

Because there are no available shortwave light sources, the light-beam deflector described above, which combines both means for light-beam deflection as well as for frequency doubling in essentially one and the same integrated-optical structural part, opens up the possibility that it will be possible to operate with a relatively long-wave but still miniature laser diode 12, thus making available a very small assembly which can be easily incorporated into a write-read head of an optical storage chip. It is obviously also possible in this case to couple the light into the strip waveguide using a light fiber.

Figure 11:
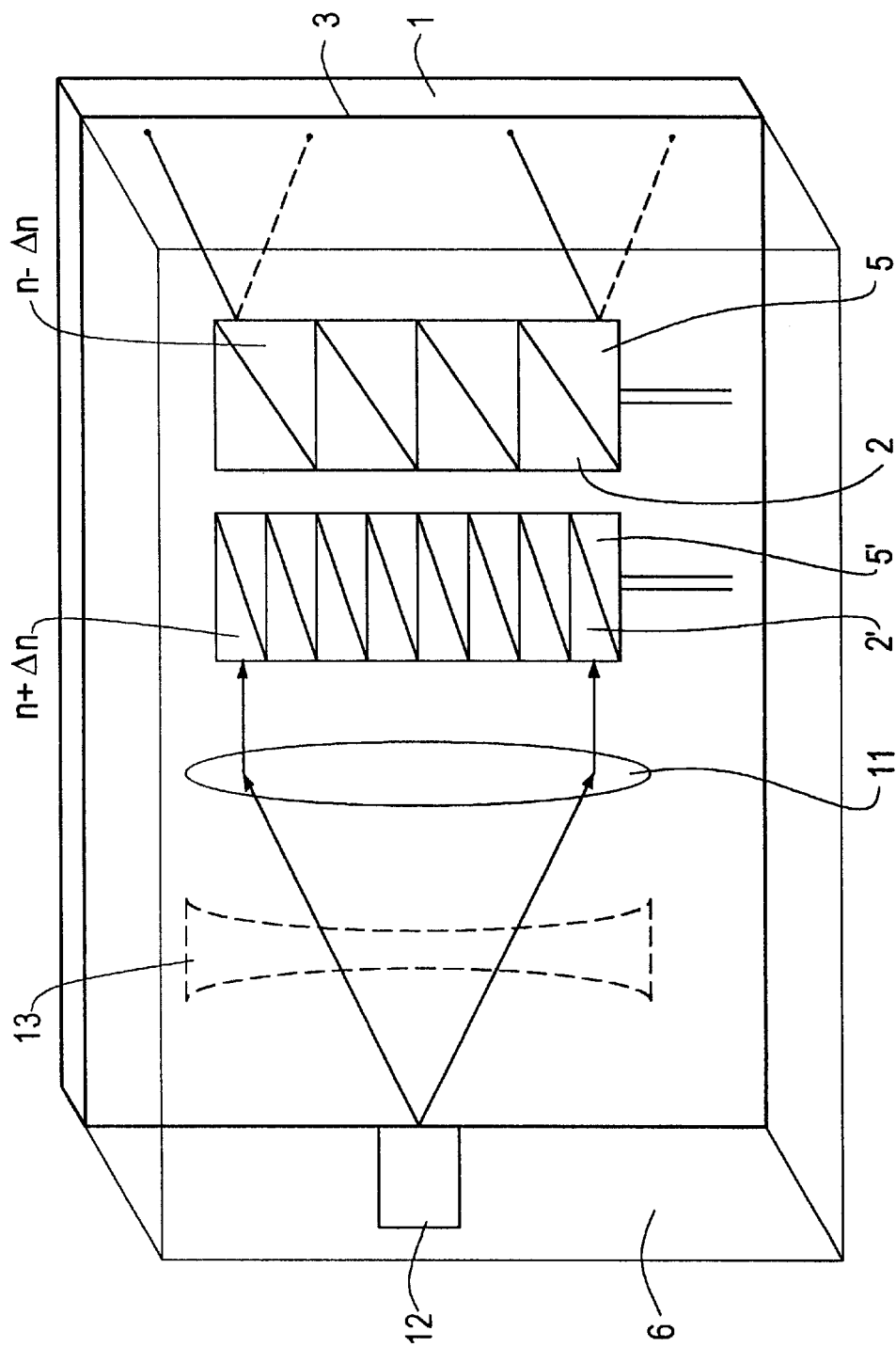
FIG. 11 shows a light-beam deflector with a first line of prismatic deflectors, arranged side by side, and a second line of side-by-side prismatic deflectors, arranged behind the first in the direction of light-beam expansion, as well as FIG. 12 presents a light-beam deflector per the invention, which can be utilized as an integrated-optical light switch.

The light-beam deflector per FIGS. 9 and 10, configured as an integrated-optical assembly and containing both prisms as well as control electrodes 5 or 10, permits a continuous light-beam deflection. The control electrodes 10 are indispensable for digital deflection. The achievable number of resolvable points is of course very limited for this application, if only one line of side-by-side prismatic deflectors 2, 5 is used. The number of resolvable points can however be increased by providing at least one additional or second line in front of the line of prismatic-deflector line, in the zone of the waveguide 3, with a for example doubled number of prismatic deflectors 2', 5'. FIG. 11 shows a light-beam deflector of this type, where two prismatic deflectors 2', 5', which are all likewise arranged alongside each other and produced in the same manner, are mounted in front of each four prismatic deflectors 2, 5, positioned side by side in a line.

Figure 12:
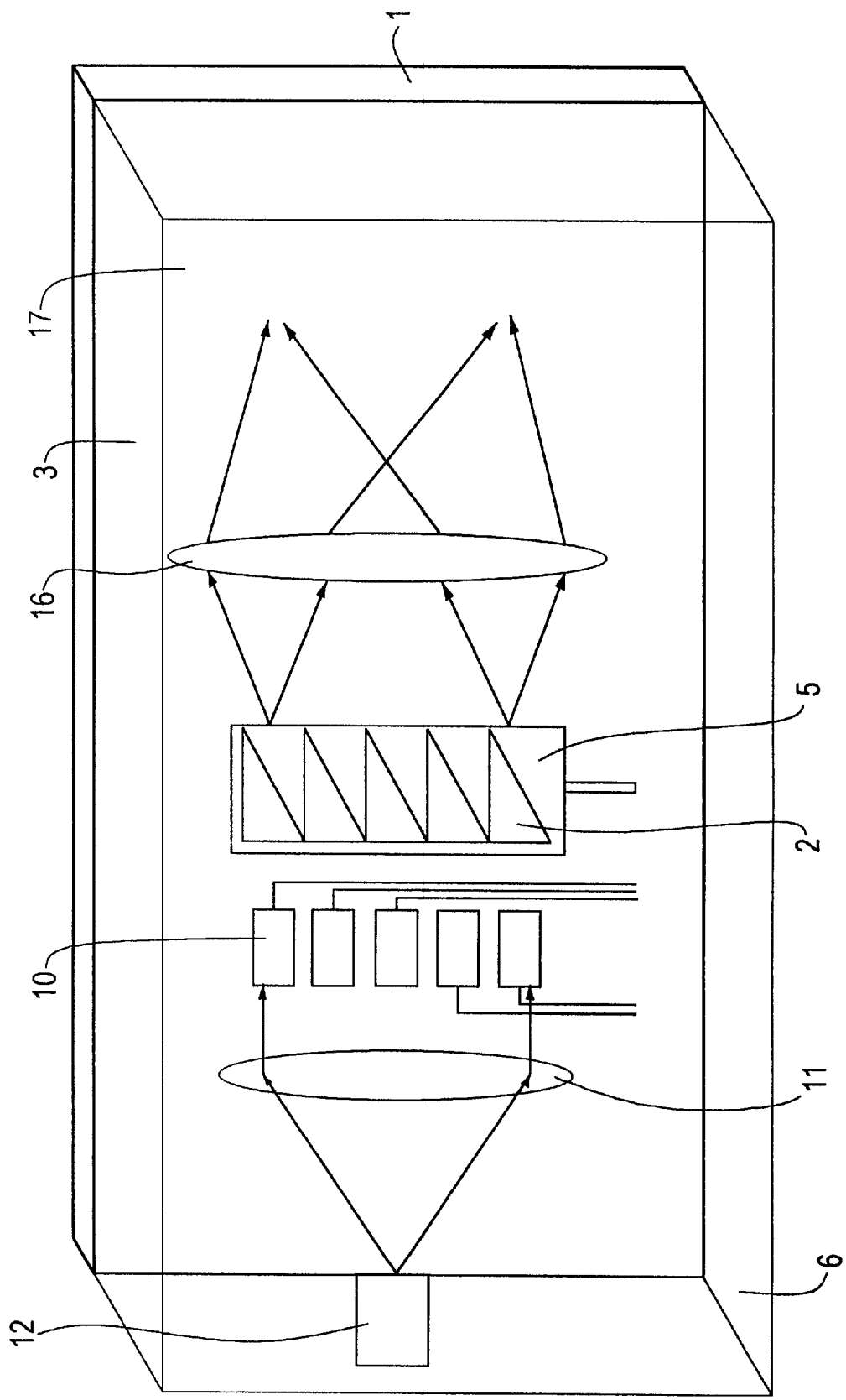

FIG. 12 shows, finally, a light-beam deflector which can be employed as a fast integrated-optical light switch. In this case, in contrast to the light-beam deflector per FIG. 9, an integrated-optical lens 16 is arranged on the layer waveguide 3, behind the prismatic deflectors 2, 5 in the direction of light-beam expansion, which focuses the deflected light. In this case, moreover, the layer waveguide 3 undergoes a transition in the focusing plane of the lens 16 into a strip waveguide 17 which forms several light-exit channels. When this light-beam deflector is switched on, i.e. when a corresponding voltage is applied to the electrode 5, it is possible to switch among the various exit channels 17. The light-beam deflector permits a very high switching time of 1 ns or less.

I claim:

1. A planar electro-optical light-beam deflector comprising:
    a line of prismatic deflectors, arranged side by side, which exhibit electrodes to which a voltage can be applied, the light-beam deflector comprising:
    a lamelliform, Z-cut lithium niobate or lithium tantalate crystal, in which the light beam is conveyed, the prismatic deflectors each comprising two zones forming a three-sided prism in which a largely uniform polarization direction is generated by inversion of the polarization direction determined by the E-field vector in domains with a spontaneous polarization direction originally in the direction of the +Z-axis, in which case respectively adjacent prismatic zones exhibit an opposite direction of polarization, a rectangular electrode being attached to these prismatic regions and the crystal equipped on its lower side with at least one counterelectrode,
    and wherein a corresponding number of control electrodes are placed on the crystal or the layer waveguide, in the direction of light-beam expansion, in front of the prismatic deflectors which are positioned side by side.

2. The planar electro-optical light-beam deflector according to claim 1 wherein the crystal is made electrically conductive beneath the layer waveguide itself, and this region serves as the counterelectrode.

3. The planar electro-optical light-beam deflector according to claim 1, wherein a dielectric layer is arranged between the crystal or the layer waveguide and the electrode.

4. The planar electro-optical light-beam deflector according to claim 1, wherein the crystal is cemented to a carrier via the side to which the rectangular electrode is attached.

5. A planar electro-optical light-beam deflector, comprising:

a line of prismatic deflectors, arranged side by side, which exhibit electrodes to which a voltage can be applied, the light-beam deflector comprising:

a lamelliform, Z-cut lithium niobate or lithium tantalate crystal, in which the light beam is conveyed, the prismatic deflectors each comprising two zones forming a three-sided prism in which a largely uniform polarization direction is generated by inversion of the polarization direction determined by the E-field vector in domains with a spontaneous polarization direction originally in the direction of the +Z-axis, in which case respectively adjacent prismatic zones exhibit an opposite direction of polarization, a rectangular electrode being attached to these prismatic regions and the crystal equipped on its lower side with at least one counterelectrode, and wherein a corresponding number of control electrodes are placed on the crystal or the layer waveguide, in the direction of light-beam expansion, in front of the prismatic deflectors which are positioned side by side, wherein an integrated-optical converging lens is arranged on the layer waveguide, in the direction of light-beam expansion ahead of the prismatic deflectors, for the collimation of the light beam coupled into the light-entry side.

6. The planar electro-optical light-beam deflector according to claim 5, wherein an integrated optical divergent lens is arranged on the layer waveguide, in front of the convergent lens.

7. The planar electro-optical light-beam deflector according to claim 5, wherein a laser diode is coupled to the waveguide.

8. The planar electro-optical light-beam deflector according to claim 5, wherein an integrated-optical convergent lens is arranged on the layer waveguide, behind the side-by-side prismatic deflectors, and the layer waveguide undergoes a transition into a strip waveguide forming several light-exit channels in the focusing plane of this convergent lens.

9. A planar electro-optical light-beam deflector, comprising:

a line of prismatic deflectors, arranged side by side, which exhibit electrodes to which a voltage can be applied, the light-beam deflector comprising:

a lamelliform, Z-cut lithium niobate or lithium tantalate crystal, in which the light beam is conveyed, the prismatic deflectors each comprising two zones forming a three-sided prism in which a largely uniform polarization direction is generated by inversion of the polarization direction determined by the E-field vector in domains with a spontaneous polarization direction originally in the direction of the +Z-axis, in which case respectively adjacent prismatic zones exhibit an opposite direction of polarization, a rectangular electrode being attached to these prismatic regions and the crystal equipped on its lower side with at least one counterelectrode, and wherein a corresponding number of control electrodes are placed on the crystal or the layer waveguide, in the direction of light-beam expansion, in front of the prismatic deflectors which are positioned side by side, and further wherein the wave guide, in the forward zone facing the light-entry side, is formed as a strip waveguide which undergoes a transition into the layer waveguide, and that the strip waveguide is equipped with a periodic grating structure consisting of individual grating elements, the individual grating elements consisting of zones in which a largely uniform polarization direction is generated by inversion of the direction of polarization in domains with spontaneous polarization in the opposite direction, in which case respectively neighboring grating elements exhibit an opposing polarization direction and the grating elements are arranged vertically relative to the direction of light-beam expansion.

10. The planar electro-optical light-beam deflector according to claim 9, wherein a laser diode is coupled to the waveguide.

11. The planar electro-optical light-beam deflector according to claim 9, wherein an integrated-optical convergent lens is arranged on the layer waveguide, behind the side-by-side prismatic deflectors, and the layer waveguide undergoes a transition into a strip waveguide forming several light-exit channels in the focusing plane of this convergent lens.

12. A planar electro-optical light-beam deflector, comprising:

a line of prismatic deflectors, arranged side by side, which exhibit electrodes to which a voltage can be applied, the light-beam deflector comprising:

a lamelliform, Z-cut lithium niobate or lithium tantalate crystal, in which the light beam is conveyed, the prismatic deflectors each comprising two zones forming a three-sided prism in which a largely uniform polarization direction is generated by inversion of the polarization direction determined by the E-field vector in domains with a spontaneous polarization direction originally in the direction of the +Z-axis, in which case respectively adjacent prismatic zones exhibit an opposite direction of polarization, a rectangular electrode being attached to these prismatic regions and the crystal equipped on its lower side with at least one counterelectrode, wherein at least two lines of side-by-side prismatic deflectors are provided, the individual lines being arranged, one behind the other, in the direction of light-beam expansion.

13. A process for the production of a planar electro-optical light-beam deflector, comprising the steps of:

generating a largely uniform polarization direction, at least near an upper side surface within respective zones; and forming a three-sided prism by inversion of the polarization direction, in domains with a spontaneous polarization direction in the direction of the +Z axis, in which case neighboring prismatic zones are polarized in opposite directions, a rectangular electrode then being attached to the crystal on side-by-side prismatic zones, in which case the crystal is provided with at least one counterelectrode on its lower side, thereby providing a line of prismatic deflectors, arranged side by side, in which a prismatic structure is first generated in a lamelliform Z-cut lithium niobate or lithium tantalate crystal, wherein a monomodal waveguide is produced, after generation of the prismatic zones, on the entire upper side surface of the crystal by proton exchange and tempering, the rectangular electrode and the counter-electrode being applied thereafter.

14. The process according to claim 13, wherein a dielectric protective layer is first generated on the waveguide, produced by proton exchange and tempering, the electrode then being applied to it.

15. The process according to claim 14, wherein the dielectric protective layer is applied by vaporization.

16. The process according to claim 14, wherein the dielectric protective layer is applied by sputtering.

17. A process for the production of a planar electro-optical light-beam deflector, comprising the steps of:

generating a largely uniform polarization direction, at least near an upper side surface within respective zones; and forming a three-sided prism by inversion of the polarization direction, in domains with a spontaneous polarization direction in the direction of the +Z axis, in which case neighboring prismatic zones are polarized in opposite directions, a rectangular electrode then being attached to the crystal on side-by-side prismatic zones, in which case the crystal is provided with at least one counterelectrode on its lower side, thereby providing a line of prismatic deflectors, arranged side by side, in which a prismatic structure is first generated in a lamelliform Z-cut lithium niobate or lithium tantalate crystal, wherein the crystal, after attachment of the electrode, is cemented to a carrier via the side to which the electrode was applied, the crystal then being polished on the back side to a predetermined thickness and the counterelectrode attached to the polished surface.

18. A process for the production of a planar electro-optical light-beam deflector, comprising the steps of:

generating a largely uniform polarization direction, at least near an upper side surface within respective zones; and forming a three-sided prism by inversion of the polarization direction, in domains with a spontaneous polarization direction in the direction of the +Z axis, in which case neighboring prismatic zones are polarized in opposite directions, a rectangular electrode then being attached to the crystal on side-by-side prismatic zones, in which case the crystal is provided with at least one counterelectrode on its lower side, thereby providing a line of prismatic deflectors, arranged side by side, in which a prismatic structure is first generated in a lamelliform Z-cut lithium niobate or lithium tantalate crystal, wherein oxygen is diffused out of the crystal following generation of the prismatic zones, a protective layer is then applied to the lower side of the crystal, a monomodal waveguide is produced on the entire top side surface of the crystal by proton exchange and tempering, metered oxygen is then diffused from the top side surface until the depth of diffusion extends a few $\mu$m below the waveguide, and the rectangular electrode is applied, finally, assigned to the triangular zones.

19. A process for the production of a planar electro-optical light-beam deflector, comprising the steps of:

generating a largely uniform polarization direction, at least near an upper side surface within respective zones; and forming a three-sided prism by inversion of the polarization direction, in domains with a spontaneous polarization direction in the direction of the +Z axis, in which case neighboring prismatic zones are polarized in opposite directions, a rectangular electrode then being attached to the crystal on side-by-side prismatic zones, in which case the crystal is provided with at least one counterelectrode on its lower side, thereby providing a line of prismatic deflectors, arranged side by side, in which a prismatic structure is first generated in a lamelliform Z-cut lithium niobate or lithium tantalate crystal, including using a Z-cut lithium niobate crystal, the inversion of the direction of polarization being effected by the application of a titanium layer and subsequent heating to a temperature in excess of 1,000° C., the triangular structure being produced photolithographically.

20. A process for the production of a planar electro-optical light-beam deflector, comprising the steps of:

generating a largely uniform polarization direction, at least near an upper side surface within respective zones; and forming a three-sided prism by inversion of the polarization direction, in domains with a spontaneous polarization direction in the direction of the +Z axis, in which case neighboring prismatic zones are polarized in opposite directions, a rectangular electrode then being attached to the crystal on side-by-side prismatic zones, in which case the crystal is provided with at least one counterelectrode on its lower side, thereby providing a line of prismatic deflectors, arranged side by side, in which a prismatic structure is first generated in a lamelliform Z-cut lithium niobate or lithium tantalate crystal, wherein the electrode is produced by the application of an electrically conductive layer and subsequent photolithographic forming.

* * * * *